July 28, 1931.  J. A. SECOR  1,816,345
METHOD OF PREPARING FUEL CHARGE FOR INTERNAL COMBUSTION ENGINES
Filed Nov. 16, 1923
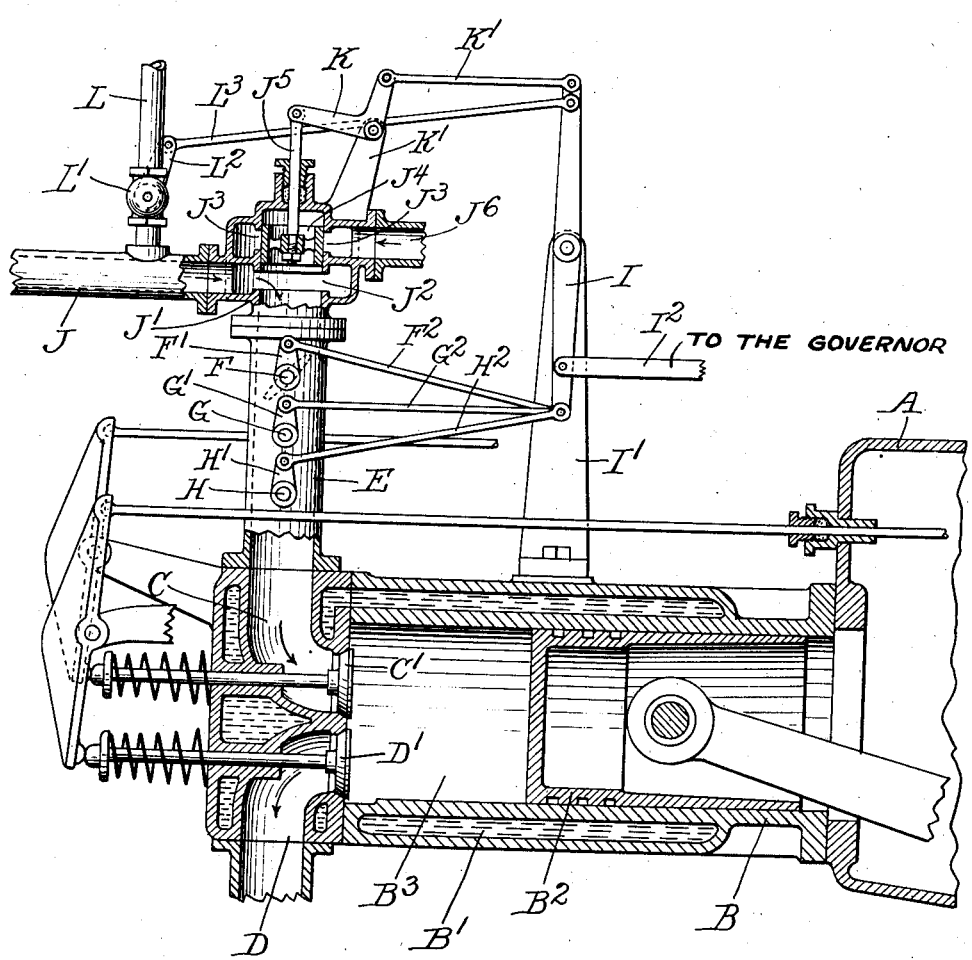
Inventor.
John A. Secor.
by Parker & Carter
Attorneys.

Patented July 28, 1931

1,816,345

UNITED STATES PATENT OFFICE

JOHN A. SECOR, OF LA PORTE, INDIANA, ASSIGNOR, BY MESNE ASSIGNMENTS, TO ALLIS-CHALMERS MANUFACTURING COMPANY, OF MILWAUKEE, WISCONSIN, A CORPORATION OF DELAWARE

METHOD OF PREPARING FUEL CHARGE FOR INTERNAL-COMBUSTION ENGINES

Application filed November 16, 1923. Serial No. 675,025.

This invention relates to a method of preparing fuel charge for an internal combustion engine, and is particularly concerned with the less volatile fuels, such for example as kerosene, gas oil, and similar non-volatile distillates. It has for one object to control and to vary in co-ordination all essential variable factors so as to produce the best possible combustion conditions for all compression pressure variations. Other objects will appear from time to time throughout the specification and claims.

In order to obtain the maximum available energy from the combustion of the fuel, a sufficient quantity of air must be mixed with the fuel to permit oxidation of all the fuel contained in the mixture. One of the important variable factors in an internal combustion engine is the compression pressure. Increasing the compression pressure results in an increase of power per unit volume of piston displacement, permits of the use of a leaner fuel mixture, and increases efficiency. Thus high compression is desirable, but is limited by the tendency of the fuel toward detonation and by the ignition temperature of the explosive mixture used.

When dealing with relatively non-volatile fuels it is difficult under present practice to maintain the temperature in the cylinder equally suitable for compression at higher and lower loads. Under normal conditions the temperatures are too cool when the engine is operating under low compression pressures and the temperatures are too high at higher compression pressures.

When an ordinary kerosene or fuel oil engine is operated under moderately high and steady compression pressure, vaporization of the oil fuel may be practically complete. If the compression pressure is varied, as is almost universally the case with practical operation, the engine will not operate at its highest efficiency. At low compression pressures and temperature, engines in the past have required a rich mixture, which while permitting operation of the engine further reduces the heat and power, and increases the attendant difficulty of excessive carbon deposit and the fouling of the valves and pistons due to incomplete combustion, which is unavoidable under these conditions. Heretofore it has been believed that the maintenance of a uniform mixture at all loads and compression pressures was to be highly desired.

As the compression pressure changes between its extremes, the conditions required for maximum efficiency with fuel oil are completely reversed. The richest mixture should be used when the engine is operating at low compression pressures and the leanest mixture should be employed when the compression pressure is at its maximum. I have discovered that the driest and therefore the most inflammable mixture should be used at the lowest compression pressure, and relatively the wettest mixture should be used at the highest compression pressure. With respect to the temperatures of the fuel mixture, the highest temperature should prevail when the compression is lowest, and when the compression is highest the lowest temperatures of the fuel mixture should prevail. When using fuel oils at higher compression pressures, the tendency toward pre-ignition or detonation is reduced by using the coolest, leanest and wettest mixture. With lower compression pressures, for ideal conditions, the mixture should be hotter, richer and drier.

In the operation of my engine I provide means for introducing fuel and water and air to form the charge which is drawn into the engine for burning. I provide means for cutting off the supply of water when the compression pressure is below a certain point and for increasing it as the pressure increases. I also provide means for heating the air so that the air drawn into the engine at low pressures is hotter than it is at the higher pressures, and I provide means whereby the hottest air is drawn in at the lowest compression pressure and the temperature of the air drawn into the engine decreases as the compression pressure increases until it reaches a point where the air is drawn in at atmospheric temperatures. At about that point the introduction of water commences and is increased in proportion to the fuel as the compression pressure increases. Thus I provide means for varying in coordination the fuel, the quantity and temperature of the air, and for adding or continuing to add water in varying proportions.

It is generally realized that fuels in the form in which they are received into the combustion chamber of internal combustion engines are not truly vaporized. Generally they are merely received in the form of floating finely divided wet particles of fuel and thus the finer the division the drier the fuel, and we may therefore speak of wet fuel or dry fuel mixtures, and we might use this expression even if the fuel were truly vaporized as it is possible to have a wet or a dry vapor. For certain conditions wet mixtures are desirable and for others dry mixtures are desirable. In kerosene engines dry mixtures tend to reduce power capacity and to increase the tendency to detonation at higher compression pressures and that comparatively wet mixtures tend to increase power at higher loads and compressions, and also reduce detonation by reducing inflammability and the rate of flame propagation within the combustion chamber. The dryness in the mixture may be varied by controlling the temperature of the air and a drier mixture is attained when the air is heated. The dryness, in relation to temperatures, should vary with the composition and distillation chain of the fuel, in the same manner as the detonation and distillation temperatures vary for different fuels under any different degree of compression, and the relation between dryness of mixture and temperature of mixture therefore differs for different hydrocarbonates. In my process I have provided means, therefore, for varying the dryness of the fuel in co-ordination with variations in the compression pressure.

I have discovered that the tendency towards detonation may be reduced, if not totally eliminated, by reducing the proportion of oxygen in the mixture, and this can be done by introducing an inert gas into the fuel mixture. This inert gas modifies the rate of flame propagation according to the percentage of inert gas dilution. I introduce the inert gas when the engine is operating under the higher compression pressures at which pressures the mixture would otherwise contain more air than required for complete oxidation of the fuel. Since the exhaust gases are practically inert, it is economical to use the cooled exhaust gases as the inert gas, and in the apparatus shown herewith and in my process I introduce suitable quantities of the exhaust gases into the mixture.

In the construction illustrated herewith all of the variations and adjustments just mentioned are carried out automatically in response to the operation of the engine by a governor so that after an initial setting has been made, the quantity of fuel, the quantity of air, its temperature, the quantity of water, the dryness of the fuel, and the quantity of inert gases, will be automatically controlled and altered in co-ordination by the governor in co-ordination with changes in the compression pressure. In this process there will be times when no water is being introduced into the charge of air and when no inert gas is being introduced into the mixture. When the correlations of the controlling variables are correct for maximum and minimum compression pressures, the variations in each instance are preferably in automatic accord with the proportionate variations in compression under varying load. I provide a unitary automatic means of control thereby regulating the power, and efficiency of the engine and controlling simultaneously and in co-ordination the composition, quantity, and relative temperatures and dryness of the fuel mixture in a throttle governed oil burning, internal combustion engine operating under varying load, it being understood that "governor" and "governed" means not merely a mechanically governed apparatus but may imply a control operating lever or any other means for varying either manually or automatically the power output of the engine.

My invention is illustrated more or less diagrammatically in the accompanying drawing, which constitutes a partial diagrammatic showing of engine with which my process may be carried out. A represents a part of the crank case of the engine. B is a cylinder provided with a cooling jacket B'. The cylinder B forms, with the piston B², a combustion chamber B³. C is a mixture inlet port controlled by a poppet valve C'. The details of the operation of this valve form no part of the present invention and are not, therefore, described or illustrated specifically. D is an exhaust outlet controlled by a poppet valve D'. E is a carburetor. The carburetor proper is provided with a controlling valve F. This valve may be of the conventional butterfly type and it is moved by means of a crank F'. Into the mixture chamber of the carburetor, water is introduced by means of a valve G, the details of which form no part of the present invention and are, therefore, not illustrated. This valve is operated by a crank G'. The combustible fuel is introduced into the carburetor by means of a valve H which is not illustrated in detail. It is operated by a crank H'. Leading from each of the cranks F', G', and H' are reach rods F², G², and H², respectively. These rods are attached to the end of the main controlling lever I. This lever is pivoted on a support I', which is secured to the engine. Pivotally connected to the lever I and in the form here shown, adjacent its lower end, is a connecting rod I² which is connected to the governor and adapted to be moved by the governor in response to its variations.

Normally the air is drawn into the carburetor through a passage J. This passage communicates with a valve housing J' which is provided with a pair of internal ports J² and J³. Mounted for vertical reciprocation within the housing J' is a valve J⁴ which is carried on a stem J⁵. The passage J normally communicates with the port J² and a second passage J⁶ normally communicates with the passage J³. The air entering the passage J is at atmospheric temperature but the air entering through passage J⁶ is heated by any suitable means, such for example as the exhaust. The valve J⁴ is raised or lowered so as to vary the proportion of heated air to that of unheated air and at its extreme limits it may either totally cut off the supply of heated air or that of unheated air.

Fastened to the upper end of the stem J⁵ is a bell crank K which is pivotally mounted on a support K'. The upper end of the bell crank K is attached to the upper end of the lever I by means of a reach rod K' and thus movement of the lever I in response to movement of the governor varies the proportion of hot to the cold air or totally cuts off one or the other.

Communicating with the passage J is a connecting passage L by means of which burned gases from the exhaust may be introduced into the passage J. In the connection L is a control valve L'. This valve is operated by means of a lever L² acted upon by a reach rod L³ which is attached to the lever I adjacent its upper end. By means of this mechanism a certain amount of the burned gases from the exhaust may be introduced into the incoming current of air, and thus a quantity of inert gas is taken into the charge. This gas need not come from the exhaust. Any inert gas would satisfy, but since the exhaust is practically an inert gas and since it is available without additional cost, it is normally preferable to use it.

By means of properly co-ordinating the proportion of the mechanical parts, the device will operate to carry out the processes of my invention. By means of the mechanism shown, the amount of fuel, the amount of water, the total amount of air, the temperature of air, and the amount of inert gas will all be automatically varied in co-ordination and in response to variation in the engine operation.

I claim:

1. The process of burning fuel in an internal combustion engine which consists in varying in co-ordination the relative proportion of the fuel and the other ingredients of the charge and the temperature of the mixture in the cylinder, by adding heated air at low compressions and by adding water at higher compressions, the proportion of air and water varying in response to variations in the engine load.

2. The process of burning fuel in an internal combustion engine which consists in varying the temperature of the fuel charge in co-ordination with the variations of the engine load by introducing into the charge at low compressions a heating medium and introducing into the charge at higher compressions a cooling medium.

3. The process of burning fuel in an internal combustion engine wherein the charge comprises air, fuel and water, which consists in varying in response to the variations in the load and in co-ordination each to the other, the amount of fuel, richness of the mixture and the temperature of the resulting charge so as to increase the temperature of the charge at low loads and decrease the temperature of the charge at high loads, by decreasing the temperature of the air as the load increases and commencing the introduction of water at the point where the air is no longer heated.

4. The process of burning fuel in an internal combustion engine wherein the charge comprises air, fuel and water, which consists in varying in response to the variations in the load and in co-ordination each to the other, the amount of fuel, richness of the mixture and the temperature of the resulting charge so as to increase the temperature of the charge at low loads and decrease the temperature of the charge at high loads, by decreasing the temperature of the air as the load increases and commencing the introduction of water at the point where the air is no longer heated, and increasing the amount of water added as the load increases.

5. The process of controlling the power output of an internal combustion engine which consists in preparing fuel charge comprising fuel, air, exhaust products and water at the higher loads, and at lower loads, fuel, air and water only, said process consisting in varying the relative dryness of the fuel mixture, the temperature of the inhaled air, the quantity and relative proportions of fuel, air exhaust products, oxygen and water contained in the fuel mixture, in co-ordination with the variations in the engine load.

6. The process of controlling the inflammability and rate of flame propagation of combustible fuel mixtures in an internal combustion engine under varying compression pressures by providing relatively dry fuel mixtures and heating the air for the mixtures at the lower compression pressures; so that the relative dryness of mixture and the temperature of inhaled air increase in co-ordination with the compression; and providing relatively wetter fuel mixtures and lower temperatures of the inhaled air at the higher compressions, so that the relative dryness of mixture and temperature of the air decrease as the compression increases; also adding exhaust products and water to the fuel mixtures at the higher compressions, so that the quantity of fuel, air and water and exhaust products increase as the load and compression pressure increase, thereby decreasing the inflammability of the mixtures at the higher compression pressures, and increasing their relative inflammability as the compression pressures decrease.

7. In an internal combustion engine means for supplying water, fuel and air at varying temperatures and in varying quantities, in combination with a governor adapted to vary in co-ordination the relative quantities of fuel, the temperature of the air, and the relative quantity of water, in co-ordination with variations in the quantity of the fuel charge, and to discontinue the introduction of water at a predetermined point as the engine load is reduced.

8. In an internal combustion engine means for supplying water, fuel and air at varying temperatures and in varying quantities, in combination with a governor adapted to vary in co-ordination the relative quantities of fuel, the temperature of the air, and the relative quantity of water, in co-ordination with variations in the quantity of the fuel charge, and to discontinue the introduction of water at a predetermined point as the engine load is reduced, and to commence the introduction of heated air at the time of discontinuing the introduction of water.

9. In an internal combustion engine means for introducing air, fuel and water in varying quantities and at varying temperatures, in combination with a governor adapted to vary the supply of fuel, and in co-ordination therewith adapted to vary the supply of air and water, and adapted to control the heat of the air and further adapted to supply air in varying degrees of heat, and to stop the supply of water when the heated air is no longer admitted.

10. The process of burning fuel in an internal combustion engine which consists in varying in response to variations of the load the quantity of fuel, the relative proportion of the fuel and the other ingredients of the charge, and the temperature of the fuel mixture, and heating the air before mixing with the fuel, the warmest air being supplied at the lowest compression pressures, and unheated air being supplied at the highest compression pressures.

11. The process of burning fuel in an internal combustion engine which consists in varying in response to variations of the load the temperature of the fuel charge in the combustion chamber before ignition by introducing into the charge at low compressions a heating medium and introducing into the charge at higher compressions a cooling medium to increase the normal inflammability of the fuel mixture at the lower loads, and relatively to decrease the normal inflammability of the fuel mixture at the higher loads, the amounts of such mediums being varied by the variations in the load.

12. The process of burning fuel in a throttle governed internal combustion engine which consists in preparing a combustible charge which comprises air, fuel and water, and in varying in co-ordination with variations in the amount of fuel, the richness of the mixture, the amount of water, and the temperature of the inhaled air.

13. The process of burning liquid fuel in a throttle governed internal combustion engine in which the relative quantities of fuel, the temperature of the air, and the relative quantity of water are varied in response to variations in the engine load and the introduction of water being stopped at a predetermined point as the engine load is reduced, there being thus no water fed at low load.

14. The process of forming explosive mixtures for internal combustion engines which includes the following steps,—supplying air and liquid fuel to the combustion chamber at all loads, adding water and inert products of combustion to the fuel charge at medium and higher loads, and varying in coordination with variations in the engine load the proportions of the various components of the fuel mixtures and temperatures the relative dryness of the mixture whereby the inflammability of the fuel mixture is maintained as compression pressure is reduced, characterized by the fact that as the proportion of air is decreased, the mixture is enriched and the temperature of the air is increased at the lower compression pressures, and as the richness of the mixture is decreased, the proportion of air is increased, the temperature is decreased and the proportion of water and products of combustion are increased in the fuel mixture as the compression pressure is increased.

15. The process of controlling the power output of an internal combustion engine which consists in varying in coordination with variations in the engine load the quantity and relative proportions of fuel, air and water in the fuel mixture, the air being heated for the reduced compressions which occur below medium load, the increments in the temperature of the air being uniformly graduated in an inverse ratio to the decreasing compression pressure.

16. The process of burning fuel in an internal combustion engine wherein the charge includes air, fuel and water which includes the following steps,—varying in response to variations in the load and in coordination with each other the amount of the fuel, the relative richness of the mixture and the temperature of the resulting charge whereby a super-normal temperature is provided at low loads to facilitate combustion and whereby a sub-normal temperature is produced at higher loads to retard ignition of the fuel mixture and the reactions of the combustion.

17. The process of burning fuel in an internal combustion engine which includes inhaling the air for the fuel mixture at atmospheric temperature from approximately medium load to maximum load, and in heating the air increasingly as the compression pressures are reduced; increasing the temperature uniformly in an inverse ratio to the decreasing compression pressure and supplying at all loads a sufficient quantity of oxygen to the mixture for chemically complete oxidation of the fuel; and introducing water and exhaust products as component ingredients of the fuel charges at the higher loads, and increasing the amounts of water and of exhaust products both quantitatively and proportionately in coordination with the engine load as the latter increases.

18. In an internal combustion engine, the process of controlling combustion within such engine which consists in controlling the temperature of the air in the fuel mixture in response to variations in the engine speed and which includes the following steps: supplying heated air to the fuel mixture under fractional load and idling, in sufficient quantities to produce a correctly proportioned lean fuel mixture which is ignitible when the proportion of air in the mixture is adapted for complete oxidation of the fuel in the combustible mixture, decreasing the temperature of the inhaled air in the mixture uniformly as the compression pressure increases, until at a predetermined medium load unheated air at atmospheric temperature is inhaled for the fuel mixture; and as the compression pressure increases under an increasing engine load, reducing the temperature of the fuel mixture proportionately by adding water in increasing quantities to the fuel charge from a certain predetermined high load up to maximum load and thus preventing pre-ignition and detonation, by the absorption of excess heat in the mixture, thus providing relatively dry fuel mixtures for the lower compression pressures and relatively wetter mixtures for the higher compression pressures.

Signed at Chicago, county of Cook and State of Illinois, this 13th day of November, 1923.

JOHN A. SECOR.